(12) United States Patent
Telep et al.

(10) Patent No.: US 9,945,447 B2
(45) Date of Patent: Apr. 17, 2018

(54) GEAR DRIVE AND ACTUATOR ARRANGEMENT

(71) Applicant: BorgWarner Inc., Auburn Hills, MI (US)

(72) Inventors: Robert J. Telep, Livonia, MI (US); Martin P. Bogen, St. Clair Shores, MI (US); James C. Sharpe, South Lyon, MI (US)

(73) Assignee: BorgWarner Inc., Auburn Hills, MI (US)

( * ) Notice: Subject to any disclaimer, the term of this patent is extended or adjusted under 35 U.S.C. 154(b) by 540 days.

(21) Appl. No.: 14/605,212

(22) Filed: Jan. 26, 2015

(65) Prior Publication Data

US 2016/0215856 A1 Jul. 28, 2016

(51) Int. Cl.
*F16H 1/28* (2006.01)
*F02B 37/18* (2006.01)
*F16H 57/08* (2006.01)
*F16H 1/48* (2006.01)

(52) U.S. Cl.
CPC ............. *F16H 1/28* (2013.01); *F02B 37/183* (2013.01); *F16H 1/48* (2013.01); *F16H 57/082* (2013.01); *Y02T 10/144* (2013.01)

(58) Field of Classification Search
None
See application file for complete search history.

(56) References Cited

U.S. PATENT DOCUMENTS

| | | | | |
|---|---|---|---|---|
| 2,697,367 | A * | 12/1954 | Winther | F16H 3/663 475/282 |
| 3,721,130 | A * | 3/1973 | McKee | B65G 13/065 74/86 |
| 9,234,562 | B2 * | 1/2016 | Ukon | F16F 15/1478 |
| 2014/0243145 | A1 * | 8/2014 | Iwasa | F16H 1/28 475/331 |
| 2015/0038292 | A1 * | 2/2015 | Tokura | F02M 35/1038 477/33 |
| 2015/0240915 | A1 * | 8/2015 | Caiazzo | F16H 1/2836 475/347 |

* cited by examiner

*Primary Examiner* — Colby M Hansen
(74) *Attorney, Agent, or Firm* — BrooksGroup (57) ABSTRACT

A number of variations may include a gear drive comprising a housing; a shaft supported in the housing; a ring gear which is coaxial and rotatable with the shaft; at least one intermediate gear constructed and arranged to engage the ring gear; an intermediate gear plate which is coaxial with the ring gear and the shaft, and wherein the intermediate gear plate includes an engagement feature and a pin, wherein the engagement feature is constructed and arranged to attach to the shaft and the pin is constructed and arranged to locate and rotatably mount the at least one intermediate gear to the intermediate gear plate; and wherein engagement of the intermediate gear plate with the shaft provides alignment of the at least one intermediate gear, the ring gear, and the shaft and allows for rotation of the intermediate gear plate and the at least one intermediate gear about the shaft.

20 Claims, 6 Drawing Sheets

View C

View E-E
FIG. 17

FIG. 18

FIG. 19 ically mount the at least one intermediate gear to the intermediate gear plate.
GEAR DRIVE AND ACTUATOR ARRANGEMENT

TECHNICAL FIELD

The field to which the disclosure generally relates to includes gears and actuators.

BACKGROUND

An engine system may include one or more gears and actuators.

SUMMARY OF ILLUSTRATIVE VARIATIONS

A number of variations may include a gear drive comprising: a housing; a shaft, wherein the shaft is supported in the housing and includes a central axis of rotation; a ring gear, wherein the ring gear is coaxial and rotatable with the shaft; at least one intermediate gear constructed and arranged to engage the ring gear; an intermediate gear plate wherein the intermediate gear plate is coaxial with the ring gear and the shaft, and wherein the intermediate gear plate includes an engagement feature and a pin, wherein the engagement feature is constructed and arranged to attach to the shaft and the pin is constructed and arranged to locate and rotatably mount the at least one intermediate gear to the intermediate gear plate; and wherein engagement of the intermediate gear plate with the shaft provides alignment of the at least one intermediate gear, the ring gear, and the shaft and allows for rotation of the intermediate gear plate and the at least one intermediate gear about the shaft.

A number of variations may include a gear drive and actuator comprising: a housing; an electrical device supported in the housing constructed and arranged to provide a rotational force in response to an electrical control signal; a rotatable shaft, wherein the rotatable shaft is constructed and arranged to receive the rotational force from the electrical device; a central gear with a plurality of gear teeth, wherein the central gear is attached to the rotatable shaft and is rotatable with the shaft; a first ring gear with a plurality of gear teeth; a second shaft supported in the housing which has a central axis of rotation; a second ring gear with a plurality of gear teeth, wherein the second ring gear is coaxial with the second shaft and operably connected and rotatable with the second shaft; at least one intermediate gear, wherein the at least one intermediate gear includes a first end with a first number of gear teeth and a second end with a second number of gear teeth, wherein the first number of gear teeth of the at least one intermediate gear engage and contact the plurality of gear teeth of the central gear and the plurality of gear teeth of the first ring gear, and wherein the second number of gear teeth of the at least one intermediate gear engage and contact the plurality of gear teeth of the second ring gear; and an intermediate gear plate, wherein the intermediate gear plate is coaxial with the ring gear and the second shaft, and wherein the intermediate gear includes an engagement feature and a pin, wherein the engagement feature is constructed and arranged to attach to the shaft and the pin is constructed and arranged to locate and rotat Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Any number of devices including, but not limited to, turbochargers and exhaust gas recirculation (EGR) valves, may use a device which may control the function and/or the performance of the device. In one illustration, one or more pneumatic and/or electric actuators may be used to provide positional control of various mechanisms on a turbocharger to adjust and maintain pressure which may be within an intake manifold of an engine. Controlling the intake manifold pressure may provide optimum performance of the turbocharger and may also maintain legislated vehicle emissions requirements.

Figure 1:
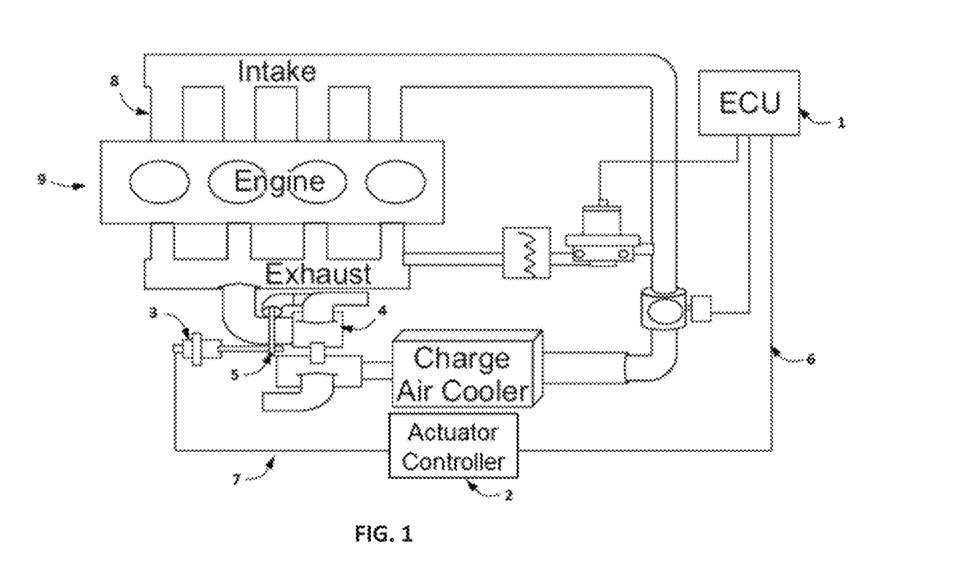
FIG. 1 illustrates a schematic of an engine system according to a number of variations.

FIG. 1 illustrates a number of variations. In one variation, an internal combustion engine 9 may include an electronic control unit (ECU) 1, an actuator controller 2, an actuator 3, a turbocharger 4, and a turbocharger control mechanism 5. In a number of variations, the ECU 1 may include a main controller and/or a control subsystem which may include one or more controllers (not separately illustrated) in communication with the components of the system for receiving and processing sensor input and transmitting output signals. The controller(s) may include one or more suitable processors and memory devices (not separately illustrated). The memory may be configured to provide storage of data and instructions that provide at least some of the functionality of the engine system and that may be executed by the processor (s). At least portions of the method may be enabled by one or more computer programs and various engine system data or instructions, operating condition data stored in memory as look-up tables, formulas, algorithms, maps, models, or the like. The control subsystem may control the parameters of the system by receiving input signals from the sensors, executing instructions or algorithms in light of sensor input signals, and transmitting suitable output signals to the various actuators, and/or components. As used herein, the term "model" may include any construct that represents something using variables, such as a look up table, map, formula, algorithm and/or the like. Models may be application specific and particular to the exact design and performance specifications of any given engine system. A controller system main controller and/or a control subsystem may include one or more controllers (not separately illustrated) in communication with the components of the system for receiving and processing sensor input and transmitting output signals in a method consistent with the illustrated variations described herein.

In a number of variations, the ECU 1 may be operatively connected to the actuator controller 2 by a first wire harness 6 which may comprise a plurality of conductors and connectors. In a number of variations, the actuator controller 2 may also be connected to the actuator 3 by a second wire harness 7 which may comprise a plurality of conductors and connectors. In a number of variations, the actuator controller 2 may be a separate component from the actuator 3, a variation of which is illustrated in FIG. 1. In another variation, the actuator controller 2 may be integrated within the actuator 3. In any number of variations, the internal combustion engine 9 may include a system which may use the turbocharger 4 and the actuator 3 to control the boost pressure within the intake manifold 8.

In a number of variations, the ECU 1 may send an electrical position input signal to the actuator controller 2 which may indicate a desired position of the actuator 3. In a number of variations, the actuator controller 2 may then provide an electrical control signal to the actuator 3 which may move the actuator 3 to the desired position. The actuator 3 may then move the control mechanism 5 of the turbocharger 4 to a desired position which may achieve a required pressure within the intake manifold 8 of the internal combustion engine 9. In a number of variations, the actuator 3 may also include a means of sensing its position and may feedback an electrical position output signal to the actuator controller 2. In a number of variations, a "closed loop" control scheme may be used to maintain a desired actuator position by comparing the feedback electrical output signal value to a desired value. The control signal to the actuator 3 may then be adjusted to maintain the position and resulting boost pressure.

In a number of variations, the actuator 3 may use an electrical device including, but not limited to, a Direct Current (D.C.) motor, for providing a means of actuation. Any number of D.C. motors may be used. In one variation, the D.C. motor may use brushes for commutating its rotating member. In another variation, the D.C. motor may be brushless including, but not limited to, a stepper motor. The actuator output may be rotary or linear motion and a gear system may be used to increase the torque or linear force.

In a number of variations, a gear arrangement 116, which may be referred to as planetary gear arrangement, may provide optimized performance requirements and may allow for a compact actuator. In a number of variations, the planetary gear arrangement 116 may comprise a plurality of gears 108, 117, 128, 129 including, but not limited to, four to eight gears. The planetary gear set 116 may be constructed and arranged so that the gears 108, 117, 128, 129 may be optimally aligned. This may prevent misalignment of the gears 108, 117, 128, 129 which may cause binding and wear that may reduce torque, durability, and reliability. In a number of variations, the gears 108, 117, 128, 129 may also be constructed and arranged to provide efficient manufacturing processes for components and product assembly.

FIGS. 2-9 illustrate a number of variations including a gear drive and actuator assembly 100. It is noted that the gear drive and actuator assembly 100 discussed hereafter provides a rotary output for illustrative purposes, however, it is within the scope of the invention to have a gear drive actuator assembly 100 which may provide linear movement by using a lead screw or another motion conversion mechanism.

Figure 3:
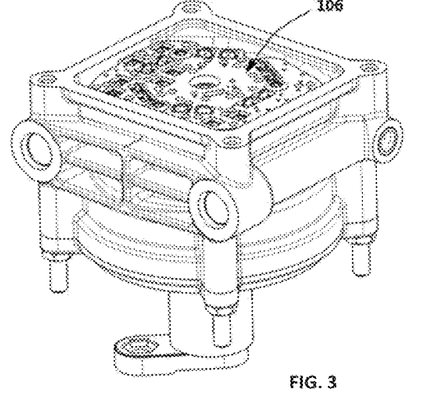
FIG. 3 illustrates a perspective view of a gear drive and actuator assembly with portions removed according to a number of variations.
Figure 4:
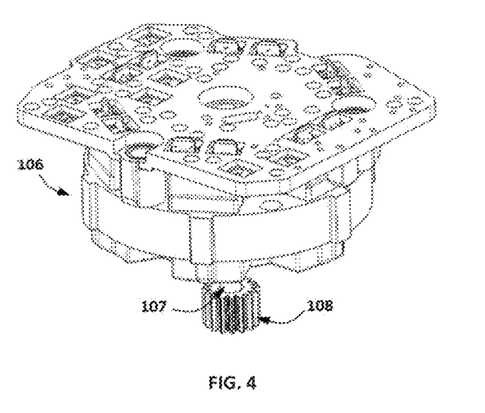
FIG. 4 illustrates a perspective view of internal components of a gear drive and actuator assembly according to a number of variations.

In a number of variations, the gear drive and actuator assembly 100 may include a housing 101. In one variation, the housing 101 may comprise a first housing portion 102 and a second housing portion 103. In another variation, one housing portion may be used or more than two housing portions may be used depending on the internal component design and manufacturing process. The housing 101 may comprise any number of suitable materials including, but not limited to, aluminum, plastic, or cast iron. In a number of variations, an electrical device 106 may be located in the first housing portion 102. In one variation, the electrical device 106 in the gear drive and actuator assembly 100 may be a brushless D.C. motor, variations of which are illustrated in FIGS. 3 and 4. In another variation, the electrical device 106 may be a brush D.C. motor, a stepper motor, or any number of rotary devices. The electrical device 106 may be secured in the first housing portion 102 in any number of variations including, but not limited to, one or more mechanical fasteners. In one variation, the one or more mechanical fasteners may include, but are not limited to, screws or rivets.

Figure 2:
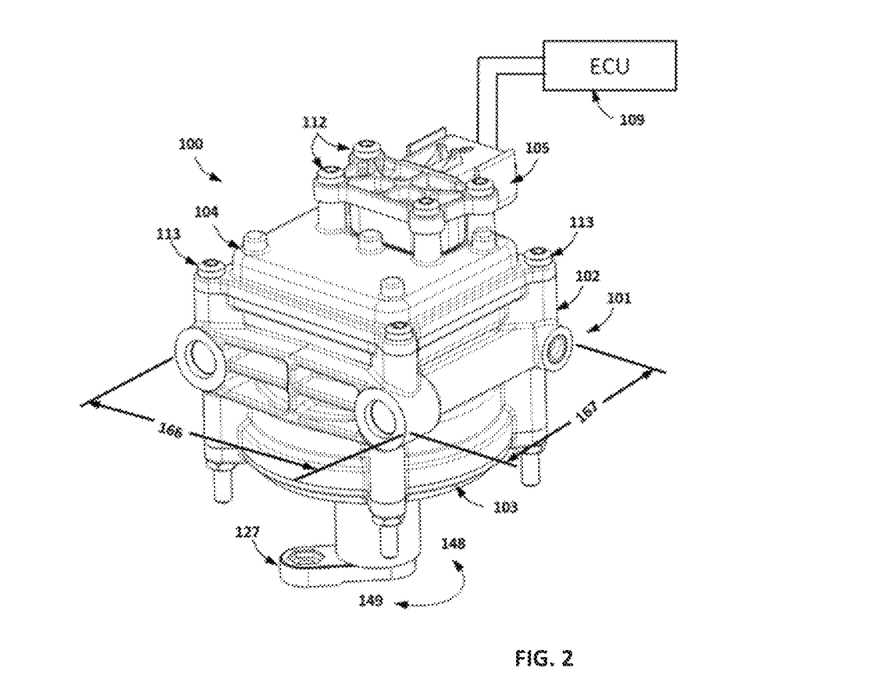
FIG. 2 illustrates a perspective view of a gear drive and actuator assembly according to a number of variations.
Figure 6:
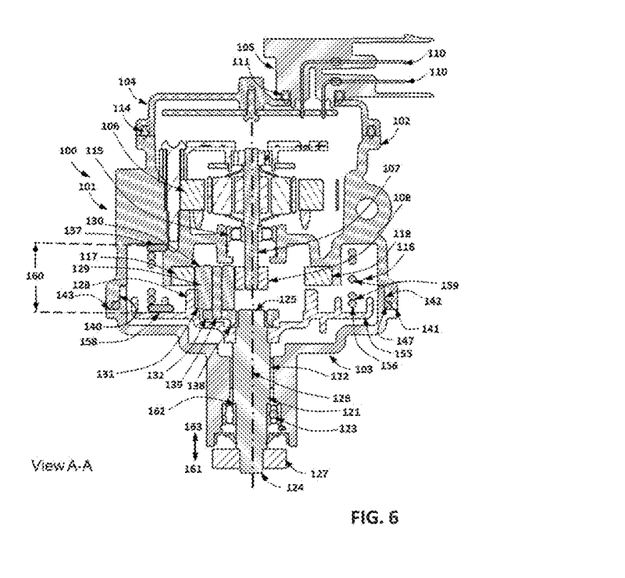
FIG. 6 illustrates a section view taken along line A-A of the gear drive and actuator assembly of FIG. 5 according to a number of variations.
Figure 7:
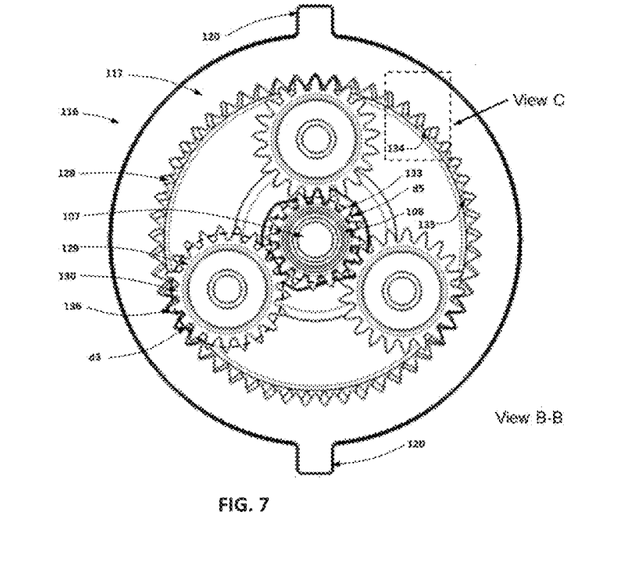
FIG. 7 illustrates a section view taken along line B-B of the gear drive and actuator assembly of FIG. 5 according to a number of variations.

In a number of variations, the gear drive and actuator assembly 100 may include a first shaft 107 and central gear 108, a variation of which is illustrated in FIG. 4, which may be rotated by the electrical device 106 in response to an electrical control signal which may be sent from an ECU 109, a variation of which is illustrated in FIG. 2. The first shaft 107 may be supported and guided by a first bearing 115 which may be secured in the first housing portion 102, a variation of which is illustrated in FIG. 6, in any number of variations including, but not limited to, press fitting, staking, or any other suitable means. In a number of variations, the central gear 108 may have a diameter d5 and a plurality of gear teeth 133 which may be located on the diameter d5 of the central gear 108, a variation of which is illustrated in FIG. 7.

Figure 5:
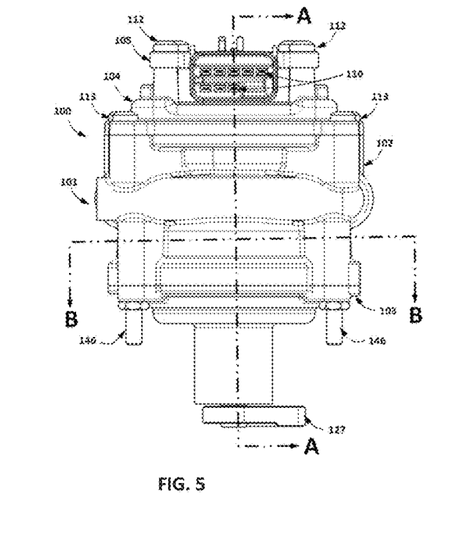
FIG. 5 illustrates an end view of a gear drive and actuator assembly according to a number of variations.

In a number of variations, the gear drive and actuator assembly 100 may also include a cover 104 and an electrical connector 105 which may be attached and sealed to the cover 104, variations of which are illustrated in FIGS. 2, 5, and 6. In one variation, the electrical connector 105 may be attached and sealed to the cover 104 by a plurality of screws 112 and a seal 111, variations of which are illustrated in FIGS. 5 and 6. In a number of variations, the electrical connector 105 may include a plurality of terminals 110 which may provide electrical connections to the electrical device 106 and may also provide the desired electrical control to the gear drive and actuator assembly 100. In one variation, the number of terminals 110 may vary between four and eight and may depend on whether the primary actuator control may be internal to the gear drive and actuator assembly 100 or in the ECU 109. In a number of variations, the electrical connector 105 may be molded from a type of plastic or other suitable material. In a number of variations, the electrical connector 105 and the cover 104 may be made as a single component or the electrical connector 105 and the cover 104 may be separate components, a variation of which is illustrated in FIG. 6. The cover 104 may be secured to the first housing portion 102 in any number of variations including, but not limited to, one or more screws 113, a crimp ring, or any other suitable means. In one variation, a seal 114 may seal the cover 104 and the first housing portion 102 from the external environment.

Figure 8:
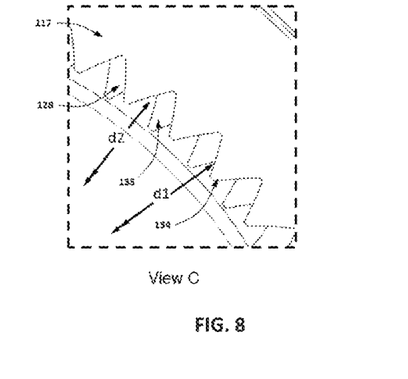
FIG. 8 illustrates an enlarged view of section C taken from the gear drive and actuator assembly of FIG. 7 according to a number of variations.

In a number of variations, a gear drive arrangement 116 may be located within the first housing portion 102 and the second housing portion 103. In a number of variations, a first ring gear 117 may be located in the counter bore 118 of the first housing portion 102, a variation of which is illustrated in FIG. 6. The first ring gear 117 may be secured to the counter bore 118 in any number of variations including, but not limited to, press fitting, staking, or any other suitable means. In a number of variations, the first ring gear 117 may be stationary and may not rotate. The first ring gear 117 may have a first diameter d1 and a plurality of gear teeth 134 located on the first diameter d1, variations of which are illustrated in FIGS. 7-8. In one variation, the first ring gear 117 may also include one or more locating/anti-rotation features 120, a variation of which is illustrated in FIG. 7, which may engage with the first housing portion 102 and which may locate the first ring gear 117 and may prevent rotation thereof.

In a number of variations, an output shaft 121 may be located in the second housing portion 103 and may be supported for rotation by a first bushing 122 and a second bearing 123, a variation of which is illustrated in FIG. 6. In a number of variations, the output shaft 121 may have a first end 124, a second end 125, and a central axis of rotation 126. The first shaft 107 may also have the same central axis of rotation 126 as the output shaft 121. In a number of variations, the first end 124 may be fitted with a lever 127 which may be attached to a device including, but not limited to, a turbocharger, requiring control of a parameter. The controlled parameter may include, but is not limited to, the closure of turbine vanes, the movement of a waste gate valve, or any other controlled parameter. In a number of variations, a second ring gear 128 may be adjacent the second end 125 of output shaft 121. The second ring gear 128 may be operatively attached to the output shaft 121 so that it may be coaxial and rotatable with the output shaft 121. In a number of variations, the second ring gear 128 may have a second diameter d2 and a plurality of gear teeth 135 located on a second diameter d2, variations of which are illustrated in FIGS. 7 and 8. The second ring gear 128 may comprise any number of materials including, but not limited to, metal or plastic. The second ring gear 128 may be secured to the output shaft 121 by any number of variations including, but not limited to, press fitting or over molding.

Figure 9:
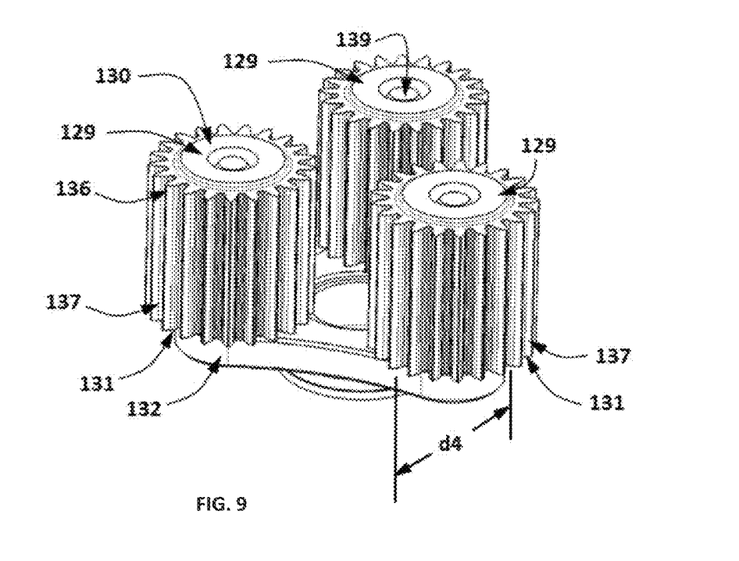
FIG. 9 illustrates a perspective view of a gear arrangement according to a number of variations.

In a number of variations, at least one intermediate gear 129 may be located between the first ring gear 117 and the second ring gear 128, a variation of which is illustrated in FIG. 7. The intermediate gear 129 may have a first end 130 which may have a third diameter d3 and a plurality of gear teeth 136 which may be located on the third diameter d3. The intermediate gear 129 may also have a second end 131 which may have a fourth diameter d4 and a plurality of gear teeth 137 which may be located on the fourth diameter d4, a variation of which is illustrated in FIG. 9. In a number of variations, the number of intermediate gears used in a gear drive arrangement 116 may be determined by the operating loads, durability requirements, and/or other parameters. It is noted that the gear drive arrangement described herein illustrates a variation which includes three intermediate gears, however, it is within the scope of the invention to use various number of gears including, but not limited to one, two, or more than three intermediate gears to achieve desired requirements.

Figure 10:
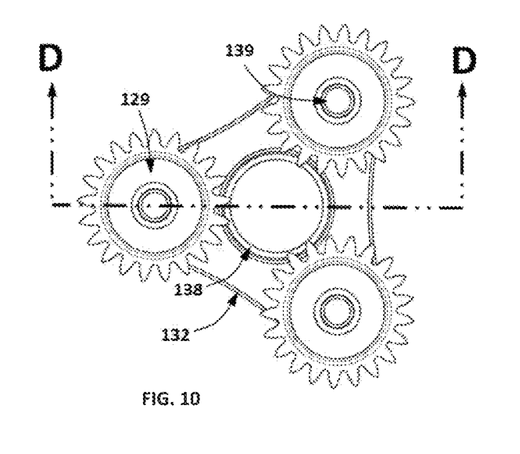
FIG. 10 illustrates a top view of a gear arrangement according to a number of variations.
Figure 11:
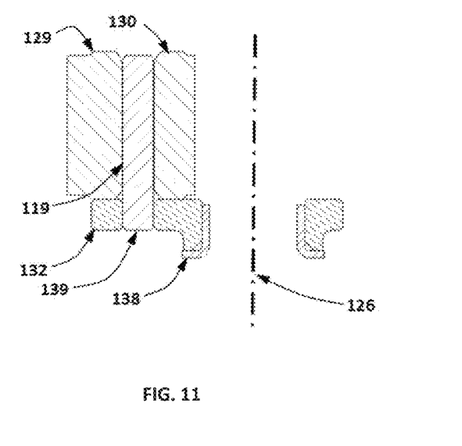
FIG. 11 illustrates a section view taken along line D-D of the gear arrangement illustrated in FIG. 10 with portions removed according to a number of variations.

Referring to FIGS. 6 and 9-11, the intermediate gear 129 may be located and supported by an intermediate gear plate 132 which may be coaxial with the output shaft 121, the second ring gear 128, and the central axis of rotation 126, which may provide precise alignment of the gears 108, 117, 128, 129 which may prevent binding, wear, misassembly, and other issues. In a number of variations, the intermediate gear plate 132 may be fitted with an engagement feature including, but not limited to, a second bushing 138, variations of which are illustrated in FIGS. 10 and 11, which may engage the second end 125 of the output shaft 121 and may provide alignment. In a number of variations, the second bushing 138 may also provide a bearing surface which may allow for independent rotation of the intermediate gear plate 132 about the output shaft 121. The second bushing 138 may be secured to the intermediate gear plate 132 in any number of variations including, but not limited to, press fitting or staking. A pin 139 may be attached to the intermediate gear plate 132 and may be used for locating and supporting the intermediate gear 129. In a number of variations, a clearance 119 between the outside diameter of the pin 139 and the intermediate gear 129, a variation of which is illustrated in FIG. 11, may allow for rotation of the intermediate gear 129 about the pin 139. In a number of variations, the locating and engagement features provided by the intermediate gear plate 132 and the second bushing 138 may provide precise alignment and movement of the gears 108, 117, 128, 129 within the gear arrangement 116.

Figure 12:
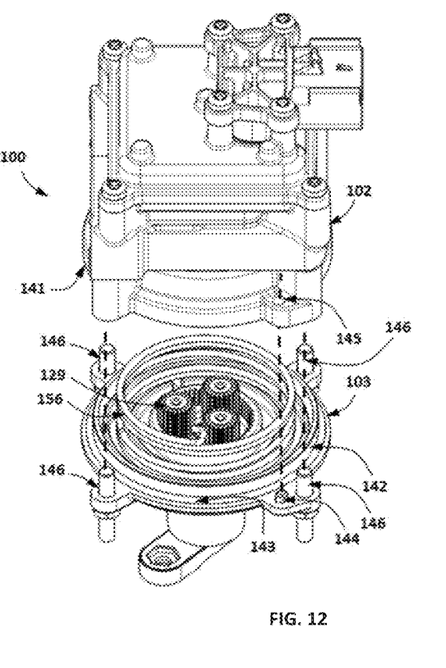
FIG. 12 illustrates a partial exploded view of a gear drive and actuator assembly according to a number of variations.

Referring to FIGS. 5, 6, and 12, in a number of variations, a first ring gear 117, which may be located in the first housing portion 102, may be coaxial and aligned with the second ring gear 128 and the output shaft 121, which may be located in the second housing portion 103, so that the gear arrangement 116 may perform optimally. It may also be desirable to have the first housing portion 102 and the second housing portion 103 "clocked" to a predetermined point on each housing portion 102, 103. In a number of variations, a first cylindrical feature 140 and a first surface 141 may be provided in the first housing portion 102, a variation of which is illustrated in FIG. 6. In a number of variations, the first cylindrical feature 140 may be coaxial with the counter bore 118 and the central axis of rotation 126. In a number of variations, the first surface 141 may be perpendicular to the first cylindrical feature 140. In a number of variations, a second cylindrical feature 142 and a second surface 143 may be provided in the second housing portion 103. The second cylindrical feature 142 may be coaxial with the central axis of rotation 126. The second surface 143 may be perpendicular to the second cylindrical feature 142. In a number of variations, the first and the second cylindrical features 140, 142 and the first and the second surfaces 141, 143 may be provided to desired fit and alignment tolerances in any number of suitable variations including, but not limited to, machining or die casting. In one variation, a clocking feature may also be provided by locating a pin 144 in the second housing portion 103 so that the pin 144 may engage a mating hole 145 which may be located in the first housing portion 102, a variation of which is illustrated in FIG. 12. In another variation, the pin may be located on the first housing portion 102 and the mating hole may be located on the second housing portion 103.

In a number of variations, the first housing portion 102 and the second housing portion 103 may be assembled by aligning and engaging of the first cylindrical feature 140 on the first housing portion 102 and the second cylindrical feature 142 on the second housing portion 103 and then rotating the first housing portion 102 and the second housing portion 103 until the pin 144 on the second housing portion aligns with and engages the mating hole 145 on the first housing portion 102. In a number of variations, the axial engagement of the first and the second cylindrical features 140, 142 may continue until the first and the second surfaces 141, 143 may be in contact. The first housing portion 102 and the second housing portion 103 may be secured together in any number of variations including, but not limited to, one or more threaded fasteners 146 or a crimp ring. In a number of variations, the first housing portion 102 and the second housing portion 103 may be sealed from the environment in any number of variations including, but not limited to, an elastomer seal 147 or a gasket. The use of a first housing portion 102 and a second housing portion 103 is discussed above for illustrative purposes; however, it is within the scoop of the invention to use a single housing which may also minimize alignment issues.

Referring to FIGS. 2 and 6-11, in a number of variations, the gear drive arrangement 116 may operate so that the first end 130 and the gear teeth 136 located on the diameter d3 of the intermediate gear 129, may operably engage with the gear teeth 133 located on the diameter d5 of the central gear 108. In a number of variations, the first end 130 and the gear teeth 136 on the diameter d3 of the intermediate gear 129 may also operably engage the gear teeth 134 located on the first diameter d1 of the first ring gear 117. In a number of variations, the second end 131 and the gear teeth 137 on the second diameter d4 of the intermediate gear 129 may operably engage with the gear teeth 135 which may be located on the second diameter d2 of the second ring gear 128.

In a number of variations, the ECU 109 may provide an electrical control signal to the electrical device 106 which may cause the first shaft 107 and the central gear 108 to rotate in a direction that may be determined by the control signal. The engagement of the gear teeth 133 on the central gear 108 and the gear teeth 136 on the first end of the intermediate gear 129 may cause the intermediated gear 129 to rotate. In a number of variations, the gear teeth 136 on the first end 130 of the intermediate gear 129 may also be engaged with the gear teeth 134 on the first ring gear 117. The first ring gear 117 may be fixed to the first housing portion 102 so that the engagement of the gear the teeth 134 on the first ring gear 117, and the rotation of the intermediated gear 129, may cause the intermediate gear 129 to move in a direction along the gear teeth 134 of the first ring gear 117. In a number of variations, the movement of the intermediate gear 129 along the gear teeth 134 of first ring gear 117 may also cause the intermediate gear plate 132 to rotate about the central axis of rotation 126 of the output shaft 121. The gear teeth 137 on the diameter d4 of the second end 131 of the intermediate gear 129 may also be engaged with the gear teeth 135 located on the second ring gear 128. The second ring gear 128 may rotate about the central axis of rotation 126 of the output shaft 121. In a number of variations, the engagement of the gear teeth and rotation of the intermediate gear 129 may cause the second ring gear 128 to rotate in a first direction 148 or a second direction 149, a variation of which is illustrated in FIG. 2, and the second ring gear 128 may be attached to the output shaft 121 so that the output shaft 121 may rotate in the same direction 148, 149 as the second ring gear 128.

In a number of variations, the direction of the rotation of the gear may be determined, in part, by the electrical control signal provided by the ECU 109 to the electrical control device 106. In one variation, the ECU 109 may provide a first electrical control signal with a first electrical polarity that may move the gears 108, 117, 128, 129 of the gear drive arrangement 116, in directions which may cause the output shaft 121 to rotate in the first direction 148. The ECU 109 may also provide a second electrical control signal with a second electrical polarity that may move the gears 108, 117, 128, 129 of the gear drive arrangement 116, in directions that may cause the output shaft 121 to rotate in a second direction 149. In a number of variations, the directional rotation of the output shaft 121 may provide control of mechanisms as previously described herein.

In a number of variations, a gear diameter dx, such as d1, may be a diameter at which the gear teeth of at least two gears contact each other. The contact point between the at least two gears may, in part, determine the force and resulting stress applied to the gear teeth of gears 108, 117, 128, 129. In one illustration, a gear drive arrangement 116 may include a central gear 108 which may have a diameter d5 of approximately 10 mm and sixteen gear teeth 133. The diameter d5 may be the contact diameter d5 for the gear teeth 133 of the central gear 108 and the gear teeth 136 at the first end 130 of the intermediate gear 129. The intermediate gear 129 may have twenty-one gear teeth 136. The twenty-one gear teeth 136 of the intermediate gear 129 may be located on a diameter d3 equal to approximately 14.03 mm at the first end 130 of the intermediate gear 129. The diameter d3 may act as the contact diameter for the gear teeth 136 of the intermediate gear 129 and the gear teeth 134 of the first ring gear 117. The first ring gear 117 may have fifty-three gear teeth 134.

The intermediate gear 129 may also have a diameter d4 which may be approximately 13.60 mm and may include twenty-one gear teeth 137 at the second end 131 of the intermediate gear 129. In this illustration, the diameter d4 may be the contact diameter for the gear teeth 137 of the intermediate gear 129 and the gear teeth 135 of the second ring gear 128. The second ring 128 may have fifty-six gear teeth 135.

The variations provided for a gear drive arrangement 116 may also be used to determine other parameters including, but not limited to, the mechanical advantage of the gear drive arrangement 116. The mechanical advantage may be the multiplying factor for torque applied to the first rotating shaft 107 and measured at the output shaft 121. The mechanical advantage may be calculated using the number of gear teeth on the central gear 108, the first ring gear 117, and the second ring gear 128. In one variation, the gear drive arrangement 116 described herein, may include a mechanical advantage that may be approximately 80.5:1. This may mean that the torque measured at the output shaft 121 may be 80.5 times the input torque applied to the first shaft 107.

The number of gear teeth 136, 137 on the first end 130 and the second end 131 of the intermediate gear 129 in the above illustration were each twenty-one and the contact diameters d3, d4 between the intermediate gear 129 and the first and second ring gears 117, 128 were different. This may be achieved by adjusting parameters which may include, but are not limited to, the contact point of the gears, the number of gear teeth, or any other suitable parameter. This may allow for the use of a single number of gear teeth and a common gear tooth profile along the entire length of the intermediate gear 129 between the first and second ends 130 and 131 of the intermediate gear 129. This may also allow for the use of less complex component tooling and manufacturing processes.

Figure 13:
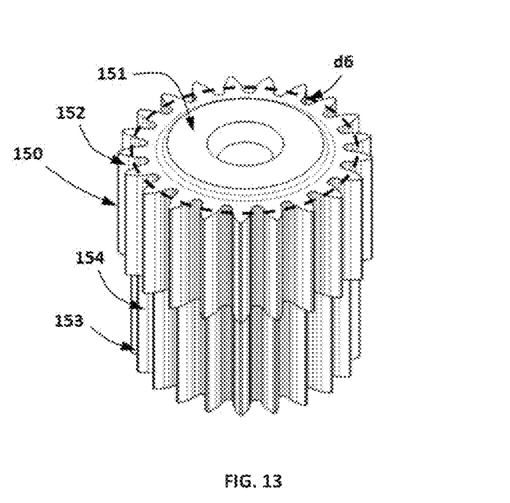
FIG. 13 illustrates a perspective view of a gear according to a number of variations.
Figure 14:
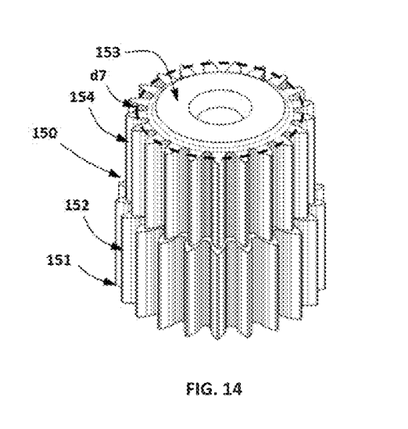
FIG. 14 illustrates a perspective view of a gear according to a number of variations.

Referring to FIGS. 13 and 14, in another variation, the gear drive arrangement 116 may include an intermediate gear design which may include a stepped feature. The gear drive components may be similar to the ones previously described, therefore, only the intermediate gear design may be described hereafter. In a number of variations, the intermediate gear 150 may include a first end 151 having a first diameter d6 which may include a plurality of gear teeth 152 located on the first diameter d6. The intermediate gear 150 may also include a second end 153 having a second diameter d7 and a plurality of gear teeth 154 located on the second diameter d7. In a number of variations, the gear section on the second end 153 may be stepped inward from the gear section on the first end 151.

In one illustration, the first end 151 of the intermediate gear 150 may include a diameter d6 of approximately 14.03 mm and twenty-one gear teeth 152. In this illustration, the diameter d6 may be the contact diameter for the gear teeth 152 on the intermediate gear 150 and the gear teeth 134 of the first ring gear 117. The first ring gear 117 may have fifty-three gear teeth 134. The intermediate gear 150 may also have a second end 153 which may have a second diameter d7 which may be approximately 13.60 mm and may include twenty-one gear teeth 154. In this illustration, the second diameter d7 may be the contact diameter for the gear teeth 154 on the intermediate gear 150 and the gear teeth 135 of the second ring gear 128. The second ring gear 128 may have fifty-six gear teeth 135. The gear tooth geometry of the intermediate gear 150 and the gear tooth geometry of the first and the second ring gears 117, 128 may be adjusted for the stepped intermediate gear design to achieve the desired contact diameters.

Referring to FIGS. 2, 5, 6, 12, and 15-17, in a number of variations, a gear drive and actuator assembly 100 may include a return feature which may move the output shaft 121 in a known direction and position when an electrical control signal or rotational force may be removed or interrupted. In a number of variations, moving the electrical device 106 or gear arrangement 116 in a known direction may allow the electrical device 106 or gear arrangement 116 to return to a known position which may prevent any number of conditions including, but not limited to, high engine boost pressure or exhaust emissions. In a number of variations, a bias spring 156, 156a may be used to provide the return feature. The bias spring 156, 156a may be located in various locations of the gear drive and actuator assemblies 100, 100a which may provide a desired package size of the gear drive and actuator assemblies 100, 100a.

In one variation, a second ring gear 128 may have a radially extending portion 155 which may be used to support a bias spring 156, a variation of which is illustrated in FIG. 6. In a number of variations, the bias spring 156 may be a helically wound spring having a first end 157, a second end 158, and a plurality of coils 159 which may be spaced apart. In a number of variations, the first end 157 may be engaged in the first housing portion 102 so that movement of the first end 157 may be prevented. In a number of variations, the second end 158 may engage the extended portion 155 and may move with the extended portion 155 of the second ring gear 128 and the output shaft 121. At least a portion of the plurality of coils 159 may be located between the first ring gear 117 and the second ring gear 128. In a number of variations, the plurality of coils 159 may also surround the intermediate gear 129. In a number of variations, the bias spring 156 may be partially wound during installation into the gear drive arrangement 116 to provide a residual torque that may urge the extended portion 155, the second ring gear 128, and the output shaft 121 to rotate in a known direction. In one variation, the bias spring 156 may be wound and installed into the gear drive arrangement 116 so that the residual torque may urge the output shaft 121 to move in a first direction 148 towards an initial or known position. In a number of variations, there may be a physical stop in the electrical device 106 or gear drive arrangement 116 which may define a known position. In another variation, the known position may be determined by an externally controlled device including, but not limited to, a turbocharger mechanism, an exhaust gas recirculation valve, or an exhaust throttle valve.

In a number of variations, the ECU 109 may provide an electrical control signal which may have an electrical polarity that may cause the electrical device 106 and the gear drive arrangement 116 to rotate the output shaft 121 in a second direction 149 which may be away from the initial or known position. The rotation of the output shaft 121, the second ring gear 128, the extended portion 155, and the second end 158 of the bias spring 156, may cause the bias spring 156 to store energy. The energy stored may be determined by the amount of rotation. In a number of variations, when the ECU 109 may remove the electrical control signal from the electrical device 106, the energy stored in the bias spring 156 may then force the extended portion 155, the second ring gear 128, and the output shaft 121 to rotate in a first direction 148 towards the initial or known position. The rotation may continue until the known position is reached.

In a number of variations, the electrical device 106 and the gear drive arrangement 116 may require approximately the same amount of torque as the residual torque provided by the bias spring 156 so that the electrical device 106 and the gear drive arrangement 116 may overcome the residual torque and initiate movement of the shaft 121. The amount of residual torque provided by the bias spring 156 may also reduce the net torque capability of the gear drive and actuator assembly 100. The net torque of a gear drive and actuator assembly 100 may be the torque that may be available for controlling a device. In one illustration, if the gross torque capability of the gear drive and the actuator assembly 100 may be 2.0 newton-meters (Nm) and the residual torque may be 0.5 Nm, the net torque capability of the gear drive and the actuator assembly 100 may be 1.5 Nm.

In a number of variations, the residual torque may be set using the alignment and clocking features of the first housing portion 102 and the second housing portion 103 as previously described. During assembly of the first housing portion 102 and the second housing portion 103, the first cylindrical feature 140 may engage with the second housing portion 103 and the second cylindrical feature 142 may engage with the first housing portion 102 at a first orientation point. At this first orientation point, the bias spring 156 may apply a zero residual torque to the output shaft 121. In a number of variations, rotation of one of the first or second housing portions 102, 103 about the central axis of rotation 126 may cause an increase in the residual torque applied to the output shaft 121. The rotation of the first or second housing portion 102, 103 may continue until the pin 144 in the second housing portion 103 may engage with the mating hole 145 in the first housing portion 102. At the point of engagement between the pin 144 and the mating hole 145, the residual torque may be at the final predetermined value. In a number of variations, the design of the bias spring 156 and the amount of rotation of the first housing portion 102 and the second housing portion 103 from the first orientation point to the point of engagement of the pin 144 in the second housing portion 103 and the mating hole 145 in the first housing portion 102 may provide a suitable means for accurately setting the residual torque on the output shaft 121.

In a number of variations, the bias spring 156 may also provide an additional axial force for the end-play control of the output shaft 121. The end-play may be the range of axial movement of the output shaft 121 along the central axis of rotation 126. In a number of variations, the plurality of bias spring coils 159 may be spaced apart in a manner which may act as a compression spring when installed in the gear drive arrangement 116. The bias spring 156 may be compressed between the first housing portion 102 and the extended portion 155 of the second ring gear 128. In a number of variations, the installed height 160 of the bias spring 156 may be less than its initial height. In one illustration, the initial wound height of bias spring 156 may be 25 mm and the installed height 160 may be 20 mm. The 5 mm of compressed height of the bias spring 156 may provide an axial force which may bear against the extended portion 155 and may force the second ring gear 128 and the output shaft 121 in the first direction 161. In a number of variations, the output shaft 121 may include a stepped feature 162 which may contact the second bearing 123 and may limit the axial movement of the output shaft 121 in the first direction 161. In a number of variations, the axial force provided by the bias spring 156 may also resist the axial movement of the output shaft 121 in a second direction 163 thereby limiting endplay movement.

Figure 15:
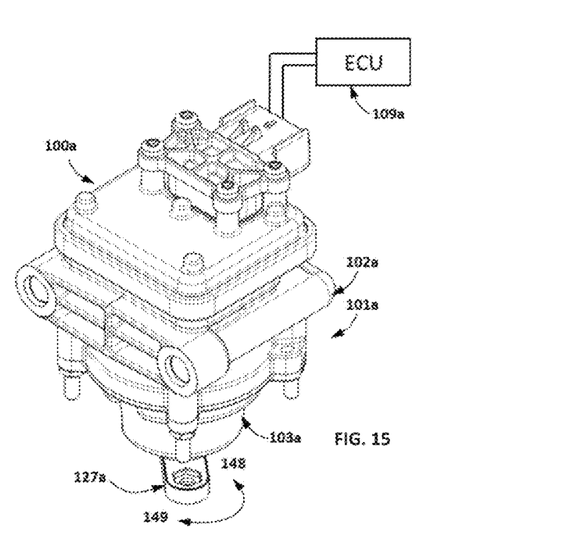
FIG. 15 illustrates a perspective view of a gear drive and actuator assembly according to a number of variations.
Figure 16:
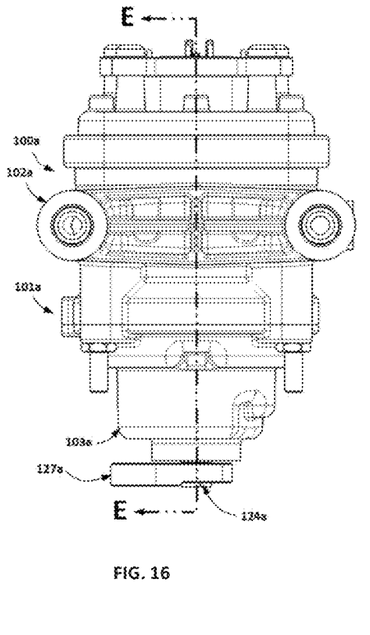
FIG. 16 illustrates an end view of a gear drive and actuator assembly according to a number of variations.
Figure 17:
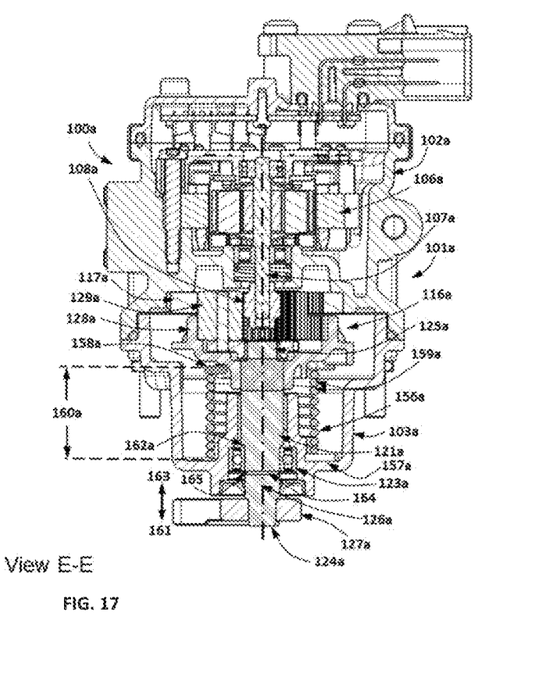
FIG. 17 illustrates a section view taken along line E-E of the gear drive and actuator assembly of FIG. 16 according to a number of variations.

FIGS. 15-17, illustrate another variation including a bias spring arrangement. In a number of variations, the construction and function of the gear drive and actuator arrangement 100a may be similar to that described above and may be not be repeated.

In a number of variations, a gear drive and actuator arrangement 100a may include an electrical device 106a and a gear drive arrangement 116a located in a housing 101a, a variation of which is illustrated in FIG. 17. The housing 101a may include a first housing portion 102a and a second housing portion 103a. In a number of variations, a gear drive arrangement 116a may comprise a first shaft 107a and a central gear 108a which may be rotated by the electrical device 106a in response to an electrical control signal from an ECU 109a. The gear drive arrangement 116a may further comprise a first ring gear 117a, a second ring gear 128a, and at least one intermediate gear 129a. A first end of the intermediate gear 129a may engage each of the first ring gear 117a and the central gear 108a. A second end of the intermediate gear 129a may engage the second ring gear 128a. In a number of variations, the second ring 128a may be attached to the output shaft 121a adjacent a second end 125a of the output shaft 121a. In a number of variations, a lever 127a may be attached to a first end 124a of the output shaft 121a. When a rotational force may be applied to the first shaft 107a, the gear drive arrangement 116b may cause the output shaft 121a to rotate.

Referring to FIGS. 6 and 17, in a number of variations, the extended portion 155 of the second ring gear 128 may be removed and a modified bias spring 156a may be moved to a location which may be coaxial with the shaft 121a and may be surrounding a portion of the shaft 121a. The second ring gear 128a may be attached to, and rotatable with, the output shaft 121a. In one variation, the removal of the extended portion 155 of the second ring gear 128 and relocation of the bias spring 156 may allow the first and second housing portions 102a and 103a to be a reduced size. In another variation, the second housing portion 103a may be increased in size in the area adjacent to the location of the bias spring 156a while the first housing portion 102a may be decreased in size which may be favorable for certain applications.

In a number of variations, the bias spring 156a may be a helically wound spring having a first end 157a, a second end 158a, and a plurality of coils 159a that may be spaced apart. The first end 157a may be stationary and may engage the second housing portion 103a. The second end 158a may be engaged with the second ring gear 128a and may be moveable with the second ring gear 128a and the output shaft 121a. At least a portion of the plurality of coils 159a may surround a portion of the output shaft 121a and a portion of the second ring gear 128a. In a number of variations, the bias spring 156a may be partially wound during installation into the gear drive arrangement 116a so that it may provide a residual torque that may urge the second ring gear 128a, and the output shaft 121a to rotate in a known direction. In one variation, the bias spring 156a may be wound and installed into the gear drive arrangement 116a and the residual torque may urge the output shaft 121a to move in a first direction 148 towards an initial or known position.

In a number of variations, the bias spring 156a arrangement may include a return feature. In one variation, the ECU 109a may provide an electrical control signal which may have an electrical polarity that may cause the electrical device 106b and the gear drive arrangement 116b to rotate the output shaft 121a in second direction 149 which may be away from the initial or known position. The rotation of the output shaft 121a, the second ring gear 128a, and the second end 158a of the bias spring 156a may cause the bias spring 156a to store energy. The energy stored may be determined by the amount of rotation. When the ECU 109a may remove the electrical control signal from the electrical device 106a, the energy stored in the bias spring 156a may force the second ring gear 128a and the output shaft 121a to rotate in a first direction 148 towards the initial or known position. The rotation may continue until the known position may be reached.

In a number of variations, the bias spring 156a arrangement may also provide an end play control as previously described herein. The plurality of bias spring coils 159a may be spaced apart in a manner which may act as a compression spring when installed in the gear drive arrangement 116a. The bias spring 156a may be compressed between the second housing portion 103a and the second ring gear 128a. In a number of variations, the installed height 160a of the bias spring 156a may be less than its initial height. In one illustration, the initial wound height of the bias spring 156a may be approximately 30 mm and the installed height 160a may be approximately 25 mm. The 5 mm of compressed height, of the bias spring 156a, may provide an axial force that may bear against the second ring gear 128a and may force the second ring gear 128a and the output shaft 121a in the second direction 163. The output shaft 121a may have a groove 164 which may receive a clip ring 165, a variation of which is illustrated in FIG. 17. The clip ring 165 may contact the second bearing 123a and may limit the travel of the output shaft 121a in the second direction 163. The axial force of the bias spring 156a may also resist the movement of the output shaft 121a in the first direction 161, however, the stepped feature 162a may also contact the second bearing 123a and may limit the axial movement of the output shaft 121a in the first direction 161 and may limit endplay movement.

Figure 18:
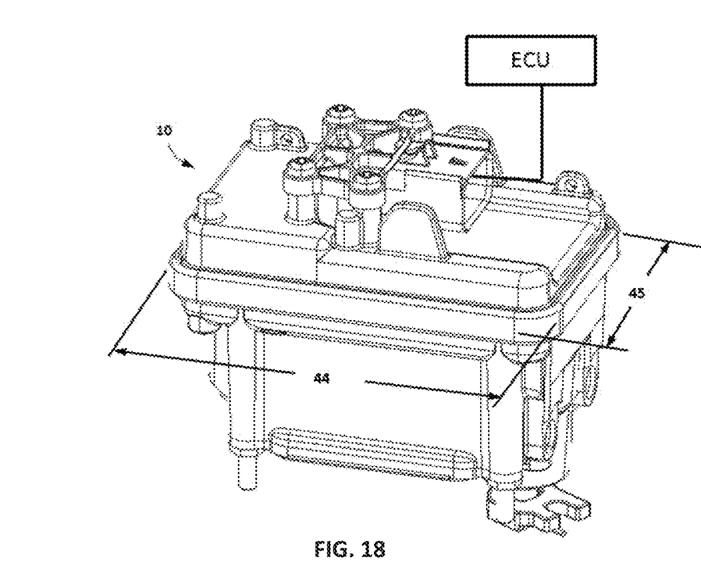
FIG. 18 illustrates a perspective view of an actuator and gear drive according to a number of variations.
Figure 19:
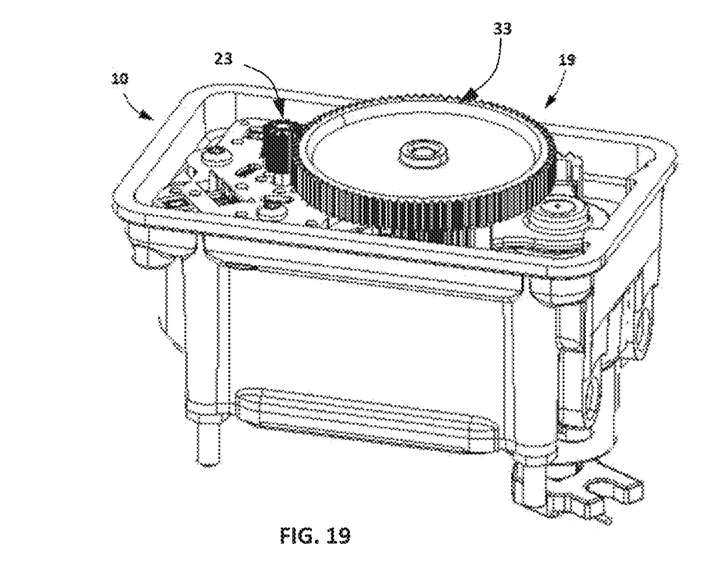
FIG. 19 illustrates a perspective view of an actuator and gear drive with portions removed according to a number of variations.

In a number of variations, the gear drive and actuator assemblies 100, 100a illustrated above may provide optimized packaging for an application. The use of the planetary gear drive arrangements 116, 116a illustrated above may allow for the actuator and gear drive arrangement 100, 100a to have a smaller length 166 and height 167 dimension, a variation of which is illustrated in FIG. 2, than the length 44 and height 45 dimension of a typical actuator and gear drive arrangement 10 which may include a gear drive arrangement 19 having a pinion gear 23 and an intermediate gear 33, variations of which are illustrated in FIGS. 18 and 19, while producing the same or greater torque output. In one variation, a typical actuator and gear drive arrangement 10 may include a length dimension 44 of approximately 134 mm, while the actuator and gear drive arrangements 100, 100a illustrated above may include a length dimension 166 of approximately 110 mm. A reduced length may be desirable for mounting the gear drive and actuator assembly 100, 100a to devices including, but not limited to, turbochargers, EGR valves, exhaust throttle valve or other devices which may have limited space.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a gear drive comprising: a housing; a shaft, wherein the shaft is supported in the housing and includes a central axis of rotation; a ring gear, wherein the ring gear is coaxial and rotatable with the shaft; at least one intermediate gear constructed and arranged to engage the ring gear; an intermediate gear plate wherein the intermediate gear plate is coaxial with the ring gear and the shaft, and wherein the intermediate gear plate includes an engagement feature and a pin, wherein the engagement feature is constructed and arranged to attach to the shaft and the pin is constructed and arranged to locate and rotatably mount the at least one intermediate gear to the intermediate gear plate; and wherein engagement of the intermediate gear plate with the shaft provides alignment of the at least one intermediate gear, the ring gear, and the shaft and allows for rotation of the intermediate gear plate and the at least one intermediate gear about the shaft.

Variation 2 may include a gear drive as set forth in Variation 1 wherein the engagement feature of the intermediate gear plate further comprises a bushing operably connected to the intermediate gear plate which is constructed and arranged for engagement with the shaft, provides alignment of the at least one intermediate gear, the ring gear, and the shaft, and allows for rotation of the intermediate gear plate and the at least one intermediate gear about the shaft.

Variation 3 may include a gear drive as set forth in any of Variations 1-2 wherein the housing is constructed and arranged to contain and align the shaft, the ring gear, the at least one intermediate gear, and the intermediate gear plate.

Variation 4 may include a gear drive as set forth in any of Variations 1-3 further comprising a cover, wherein the cover is attached to the housing.

Variation 5 may include a gear drive as set forth in any of Variations 1-4 wherein the housing further comprises a first housing portion and a second housing portion and wherein the first housing portion and the second housing portion include a clocking feature.

Variation 6 may include a gear drive and actuator comprising: a housing; an electrical device supported in the housing constructed and arranged to provide a rotational force in response to an electrical control signal; a rotatable shaft, wherein the rotatable shaft is constructed and arranged to receive the rotational force from the electrical device, a central gear with a plurality of gear teeth, wherein the central gear is attached to the rotatable shaft and is rotatable with the shaft; a first ring gear with a plurality of gear teeth; a second shaft supported in the housing which has a central axis of rotation; a second ring gear with a plurality of gear teeth, wherein the second ring gear is coaxial with the second shaft and operably connected and rotatable with the second shaft; at least one intermediate gear, wherein the at least one intermediate gear includes a first end with a first number of gear teeth and a second end with a second number of gear teeth, wherein the first number of gear teeth of the at least one intermediate gear engage and contact the plurality of gear teeth of the central gear and the plurality of gear teeth of the first ring gear, and wherein the second number of gear teeth of the at least one intermediate gear engage and contact the plurality of gear teeth of the second ring gear; and an intermediate gear plate, wherein the intermediate gear plate is coaxial with the second ring gear and the second shaft, and wherein the intermediate gear plate includes an engagement feature and a pin, wherein the engagement feature is constructed and arranged to attach to the second shaft and the pin is constructed and arranged to locate and rotatably mount the at least one intermediate gear to the intermediate gear plate.

Variation 7 may include a gear drive and actuator as set forth in Variation 6 wherein when an electrical control signal is applied to the electrical device it causes the electrical control device to rotate and deliver a rotational force to the rotatable shaft and the central gear so that the central gear causes rotation and movement of the at least one intermediate gear, the intermediate gear plate, the second ring gear, and the second shaft; and wherein the engagement of the intermediate gear plate with the second shaft provides alignment of the at least one intermediate gear, the second ring gear, and the second shaft and allows for rotation of the intermediate gear plate and the at least one intermediate gear about the second shaft Variation 8 may include a gear drive and actuator as set forth in any of Variations 6-7 wherein the first number of gear teeth on the first end of the intermediate gear is the same as the second number of gear teeth on the second end of the at least one intermediate gear; wherein the first number of gear teeth on the first end of the intermediate gear and the second number of gear teeth on the second end of the at least one intermediate gear have a same gear tooth profile geometry; and wherein a first contact point of the plurality of gear teeth on the first ring gear and the first number of gear teeth on the first end of the at least one intermediate gear is different than a second contact point of the plurality of gear teeth on the second ring gear and the second number of gear teeth on the second end of the at least one intermediate gear.

Variation 9 may include a gear drive and actuator as set forth in any of Variations 6-8 wherein the second number of gear teeth at the second end of the at least one intermediate gear are stepped inward, along a diameter, from the first number of gear teeth at the first end of the at least one intermediate gear.

Variation 10 may include a gear drive and actuator as set forth in any of Variations 6-9 wherein the housing is constructed and arranged to contain and align the electrical device, the rotatable shaft, the central gear, the first ring gear, the second shaft, the second ring gear, the at least one intermediate gear, and the intermediate gear plate.

Variation 11 may include a gear drive and actuator as set forth in Variation 10 wherein the electrical control signal is sent from an electronic control unit.

Variation 12 may include a gear drive and actuator as set forth in any of Variations 6-11 wherein the first ring gear further comprises at least one locating and anti-rotation feature, and wherein the at least one locating and anti-rotation feature engages with the housing to position the first ring gear and prevent rotation of the first ring gear.

Variation 13 may include a gear drive and actuator as set forth in any of Variations 6-12 further comprising a cover, wherein the cover is attached to the housing.

Variation 14 may include a gear drive and actuator as set forth in any of Variations 6-13 further comprising an electrical connector, wherein the electrical connector is attached to the cover and is operably connected to the electrical device.

Variation 15 may include a gear drive and actuator as set forth in any of Variations 6-14 wherein the electrical connector is sealed to the cover.

Variation 16 may include a gear drive and actuator as set forth in any of Variations 6-15 wherein a first end of the output shaft is fitted with a lever.

Variation 17 may include a gear drive and actuator as set forth in Variation 16 wherein the lever is attached to a device.

Variation 18 may include a gear drive and actuator as set forth in Variation 17 wherein the device is a turbocharger.

Variation 19 may include a gear drive and actuator as set forth in any of Variations 6-18 wherein the housing further comprises a first housing portion and a second housing portion and wherein the first housing portion and the second housing portion include a clocking feature.

Variation 20 may include a gear drive and actuator as set forth in Variation 19 wherein the clocking feature includes a pin on at least one of the first housing portion or the second housing portion and an opening on at least one of the first housing portion or the second housing portion, and wherein the pin engages the opening to clock and align the first housing portion and the second housing portion.

The above description of select variations within the scope of the invention is merely illustrative in nature and, thus, variations or variants thereof are not to be regarded as a departure from the spirit and scope of the invention.

What is claimed is:

1. A gear drive comprising:
   a housing;
   a shaft, wherein the shaft is supported in the housing and includes a central axis of rotation;
   a ring gear, wherein the ring gear is coaxial and rotatable with the shaft;
   at least one intermediate gear constructed and arranged to engage the ring gear;
   an intermediate gear plate wherein the intermediate gear plate is coaxial with the ring gear and the shaft, and wherein the intermediate gear plate includes an engagement feature and a pin, wherein the engagement feature is constructed and arranged to attach to the shaft and the pin is constructed and arranged to locate and rotatably mount the at least one intermediate gear to the intermediate gear plate; and
   wherein engagement of the intermediate gear plate with the shaft provides alignment of the at least one intermediate gear, the ring gear, and the shaft and allows for rotation of the intermediate gear plate and the at least one intermediate gear about the shaft.

2. The gear drive of claim 1 wherein the engagement feature of the intermediate gear plate further comprises a bushing operably connected to the intermediate gear plate which is constructed and arranged for engagement with the shaft, provides alignment of the at least one intermediate gear, the ring gear, and the shaft, and allows for rotation of the intermediate gear plate and the at least one intermediate gear about the shaft.

3. The gear drive of claim 1 wherein the housing is constructed and arranged to contain and align the shaft, the ring gear, the at least one intermediate gear, and the intermediate gear plate.

4. The gear drive of claim 1 further comprising a cover, wherein the cover is attached to the housing.

5. The gear drive of claim 1 wherein the housing further comprises a first housing portion and a second housing portion and wherein the first housing portion and the second housing portion include a clocking feature.

6. A gear drive and actuator comprising:
   a housing;
   an electrical device supported in the housing constructed and arranged to provide a rotational force in response to an electrical control signal;
   a rotatable shaft, wherein the rotatable shaft is constructed and arranged to receive the rotational force from the electrical device;
   a central gear with a plurality of gear teeth, wherein the central gear is attached to the rotatable shaft and is rotatable with the shaft;
   a first ring gear with a plurality of gear teeth;
   a second shaft supported in the housing which has a central axis of rotation;
   a second ring gear with a plurality of gear teeth, wherein the second ring gear is coaxial with the second shaft and operably connected and rotatable with the second shaft;
   at least one intermediate gear, wherein the at least one intermediate gear includes a first end with a first number of gear teeth and a second end with a second number of gear teeth, wherein the first number of gear teeth of the at least one intermediate gear engage and contact the plurality of gear teeth of the central gear and the plurality of gear teeth of the first ring gear, and wherein the second number of gear teeth of the at least one intermediate gear engage and contact the plurality of gear teeth of the second ring gear; and an intermediate gear plate, wherein the intermediate gear plate is coaxial with the second ring gear and the second shaft, and wherein the intermediate gear plate includes an engagement feature and a pin, wherein the engagement feature is constructed and arranged to attach to the shaft and the pin is constructed and arranged to locate and rotatably mount the at least one intermediate gear to the intermediate gear plate.

7. The gear drive and actuator of claim 6 wherein when an electrical control signal is applied to the electrical device it causes the electrical control device to rotate and deliver a rotational force to the rotatable shaft and the central gear so that the central gear causes rotation and movement of the at least one intermediate gear, the intermediate gear plate, the second ring gear, and the second shaft; and wherein the engagement of the intermediate gear plate with the second shaft provides alignment of the at least one intermediate gear, the second ring gear, and the second shaft and allows for rotation of the intermediate gear plate and the at least one intermediate gear about the second shaft.

8. The gear drive and actuator of claim 6 wherein the first number of gear teeth on the first end of the intermediate gear is the same as the second number of gear teeth on the second end of the at least one intermediate gear;

wherein the first number of gear teeth on the first end of the intermediate gear and the second number of gear teeth on the second end of the at least one intermediate gear have a same gear tooth profile geometry; and wherein a first contact point of the plurality of gear teeth on the first ring gear and the first number of gear teeth on the first end of the at least one intermediate gear is different than a second contact point of the plurality of gear teeth on the second ring gear and the second number of gear teeth on the second end of the at least one intermediate gear.

9. The gear drive and actuator of claim 6 wherein the second number of gear teeth at the second end of the at least one intermediate gear are stepped inward, along a diameter, from the first number of gear teeth at the first end of the at least one intermediate gear.

10. The gear drive and actuator of claim 6 wherein the housing is constructed and arranged to contain and align the electrical device, the rotatable shaft, the central gear, the first ring gear, the second shaft, the second ring gear, the at least one intermediate gear, and the intermediate gear plate.

11. The gear drive and actuator of claim 6 wherein the electrical control signal is sent from an electronic control unit.

12. The gear drive and actuator of claim 6 wherein the first ring gear further comprises at least one locating and anti-rotation feature, and wherein the at least one locating and anti-rotation feature engages with the housing to position the first ring gear and prevent rotation of the first ring gear.

13. The gear drive and actuator of claim 6 further comprising a cover, wherein the cover is attached to the housing.

14. The gear drive and actuator of claim 13 further comprising an electrical connector, wherein the electrical connector is attached to the cover and is operably connected to the electrical device.

15. The gear drive and actuator of claim 14 wherein the electrical connector is sealed to the cover.

16. The gear drive and actuator of claim 6 wherein a first end of the output shaft is fitted with a lever.

17. The gear drive and actuator of claim 16 wherein the lever is attached to a device.

18. The gear drive and actuator of claim 17 wherein the device is a turbocharger.

19. The gear drive and actuator of claim 6 wherein the housing further comprises a first housing portion and a second housing portion and wherein the first housing portion and the second housing portion include a clocking feature.

20. The gear drive and actuator of claim 19 wherein the clocking feature includes a pin on at least one of the first housing portion or the second housing portion and an opening on at least one of the first housing portion or the second housing portion, and wherein the pin engages the opening to clock and align the first housing portion and the second housing portion.

* * * * *